United States Patent
Tappan et al.

(10) Patent No.: US 10,838,583 B2
(45) Date of Patent: Nov. 17, 2020

(54) SYSTEMS AND METHODS FOR PRIORITIZING AND MONITORING DEVICE STATUS IN A CONDITION MONITORING SOFTWARE APPLICATION

(71) Applicant: General Electric Company, Schenectady, NY (US)

(72) Inventors: Jacqueline Marie Tappan, Minden, NV (US); Ryan Gregory Roaldson, Minden, NV (US); Nicholas Ryan Aboumrad, Reno, NV (US)

(73) Assignee: General Electric Company, Schenectady, NY (US)

( * ) Notice: Subject to any disclaimer, the term of this patent is extended or adjusted under 35 U.S.C. 154(b) by 139 days.

(21) Appl. No.: 15/377,747

(22) Filed: Dec. 13, 2016

(65) Prior Publication Data

US 2017/0336930 A1 Nov. 23, 2017

Related U.S. Application Data

(60) Provisional application No. 62/337,739, filed on May 17, 2016.

(51) Int. Cl.
*G06F 3/0482* (2013.01)
*G05B 23/02* (2006.01)
(Continued)

(52) U.S. Cl.
CPC ....... *G06F 3/0482* (2013.01); *G05B 23/0272* (2013.01); *G08B 21/18* (2013.01); *G05B 2219/23178* (2013.01); *G06T 11/206* (2013.01)

(58) Field of Classification Search
CPC .............................. G06F 3/0482; G08B 21/18
See application file for complete search history.

(56) References Cited

U.S. PATENT DOCUMENTS

| 4,812,819 A | 3/1989 | Corsberg |
| 5,025,143 A | 6/1991 | Dayhoff |

(Continued)

FOREIGN PATENT DOCUMENTS

| EP | 0389132 A2 | 9/1990 |
| WO | 2015/099895 A1 | 7/2015 |

OTHER PUBLICATIONS

Extended European Search Report and Opinion issued in connection with corresponding EP Application No. 17171505.5 dated Sep. 20, 2017.

*Primary Examiner* — Seth A Silverman
(74) *Attorney, Agent, or Firm* — Mintz Levin Cohn Ferris Glovsky and Popeo, P.C.

(57) ABSTRACT

A system includes components in an industrial environment that include an asset and a monitoring device that monitors the asset. The system also includes processors communicatively coupled to each component. The processors receive a dataset associated with each component that includes a data point associated with a respective component, a measurement associated with the data point, and an alarm status associated with the respective component. The processors also generate a first list of the components in a first portion of a graphical user interface. The processors further receive a selection of a first component. The processors also generate a second list of the data point associated with the first component, the measurement associated with the data point, and the alarm status associated with the first component, in a second portion of the graphical user interface.

15 Claims, 12 Drawing Sheets

(51) Int. Cl.
*G08B 21/18* (2006.01)
*G06T 11/20* (2006.01)

(56) References Cited

U.S. PATENT DOCUMENTS

| | | |
|---|---|---|
| 5,590,062 A | 12/1996 | Nagamitsu et al. |
| 6,889,096 B2 | 5/2005 | Spriggs et al. |
| 7,165,226 B2 | 1/2007 | Thurner et al. |
| 7,567,844 B2 | 7/2009 | Thomas et al. |
| 7,676,294 B2 | 3/2010 | Baier et al. |
| 8,026,933 B2 | 9/2011 | Baier et al. |
| 9,063,639 B2 | 6/2015 | Grewal |
| 2002/0029134 A1 | 3/2002 | Friedrich et al. |
| 2004/0090467 A1 | 5/2004 | Bonura et al. |
| 2004/0186927 A1* | 9/2004 | Eryurek ............ G05B 15/02 710/12 |
| 2004/0259276 A1 | 12/2004 | Yue et al. |
| 2005/0248560 A1 | 11/2005 | Agrawala et al. |
| 2006/0025122 A1* | 2/2006 | Harris ............ H04W 4/16 455/419 |
| 2006/0190584 A1 | 8/2006 | Skold et al. |
| 2007/0165964 A1 | 7/2007 | Wolf et al. |
| 2008/0062167 A1 | 3/2008 | Boggs et al. |
| 2009/0088875 A1* | 4/2009 | Baier ............ G05B 19/41865 700/83 |
| 2009/0216341 A1 | 8/2009 | Enkerud et al. |
| 2009/0268029 A1 | 10/2009 | Haussmann et al. |
| 2009/0319058 A1 | 12/2009 | Rovaglio et al. |
| 2010/0123594 A1 | 5/2010 | Schleiss et al. |
| 2011/0075257 A1 | 3/2011 | Hua et al. |
| 2011/0193704 A1 | 8/2011 | Harper et al. |
| 2011/0264424 A1 | 10/2011 | Miwa et al. |
| 2013/0152003 A1* | 6/2013 | Ricci ............ H04W 4/90 715/765 |
| 2013/0246858 A1 | 9/2013 | Ceglia et al. |
| 2014/0359459 A1 | 12/2014 | Smith et al. |

* cited by examiner

FIG. 4

SYSTEMS AND METHODS FOR PRIORITIZING AND MONITORING DEVICE STATUS IN A CONDITION MONITORING SOFTWARE APPLICATION

CROSS-REFERENCE TO RELATED APPLICATION

This application claims priority to and benefit from U.S. Provisional Application No. 62/337,739, filed May 17, 2016, entitled "Systems and Methods for Prioritizing and Monitoring Device Status in a Condition Monitoring Software Application," the contents of which is incorporated by reference in its entirety.

BACKGROUND

The subject matter disclosed herein relates to systems and methods for displaying content presented on a graphical user interface (GUI) of a condition monitoring system. More specifically, the subject matter disclosed herein relates to prioritizing the content displayed on the GUI based on displaying the content in a list format and providing visual indications of asset and monitoring device statuses.

Industrial monitoring systems, such as asset condition monitoring systems, generally provide monitoring capabilities for various types of mechanical devices and systems. For example, an industrial monitor may monitor one or more operational parameters of a gas turbine system. By specific example, the industrial monitoring system may include a number of sensors (e.g., temperature sensors, pressure sensors, flow sensors, and so forth) disposed throughout the gas turbine system. Such sensors may allow the industrial monitoring system to determine parameters of the mechanical system based, at least in part, on input received from these sensors. Additionally, certain industrial monitoring systems may include one or more graphical user interfaces (GUIs) that may be used to present (e.g., to an operator) the determined parameters of the mechanical system being monitored.

In this manner, condition monitoring systems may provide users with valuable information regarding the health or condition of various machines in an industrial environment. For instance, condition monitoring systems may receive inputs from a broad range of sources in an industrial plant including permanent and portable condition monitoring hardware/software, process control and automation hardware/software, process historians, maintenance management and reliability software, spreadsheets, operator logs, and the like. Using the data received from these sources, a user of the condition monitoring systems may analyze the data using various tools provided by the condition monitoring systems. However, due to the amount and variety of data that can be received, it may be difficult for the user to get an accurate understanding of data that is relevant to the user.

BRIEF DESCRIPTION

Certain embodiments commensurate in scope with the present disclosure are summarized below. These embodiments are not intended to limit the scope of the present disclosure, but rather to provide a brief summary of possible forms of the present disclosure. Indeed, the present disclosure may encompass a variety of forms that may be similar to or different from the embodiments set forth below.

In one embodiment, a system includes multiple components in an industrial environment that include at least one asset and at least one monitoring device that monitors the at least one asset. The system also includes one or more processors communicatively coupled to each component of the plurality of components. The one or more processors receive a dataset associated with each component, wherein each dataset includes at least one data point associated with a respective component, at least one measurement associated with the at least one data point, and at least one alarm status associated with the respective component. The one or more processors also generate a first list of the components in a first portion of a graphical user interface. The one or more processors further receive a selection of a first component. The one or more processors also generate a second list of the at least one data point associated with the first component, the at least one measurement associated with the at least one data point, and the at least one alarm status associated with the first component, in a second portion of the graphical user interface.

In another embodiment, a method includes receiving, with one or more processors, a dataset associated with each component in an industrial environment, wherein each component includes at least one asset and at least one monitoring device that monitors the at least one asset, wherein the dataset includes at least one data point associated with a respective component, at least one measurement associated with the at least one data point, and at least one alarm status associated with the respective component. The method also includes generating, with the one or more processors, a first list of the components in a first portion of a graphical user interface. The method further includes receiving, with the one or more processors, a selection of a first component. The method also includes generating, with the one or more processors, a second list of the at least one data point associated with the first component, the at least one measurement associated with the at least one data point, and the at least one alarm status associated with the first component, in a second portion of the graphical user interface.

In yet another embodiment, one or more tangible, non-transitory, machine-readable media that include instructions that cause a processor to receive at least one data point associated with each sub-component of each component of one or more components in an industrial environment, at least one measurement associated with the at least one data point, and at least one alarm status associated with the sub-component, wherein the sub-component includes at least one asset and at least one monitoring device that monitors the at least one asset. The instructions also cause the processor to generate a first list of the one or more components in a first portion of a graphical user interface. The instructions further the processor to receive a first selection of a first component. The instructions also cause the processor to generate a second list of one or more sub-components of the first component in the first portion of the graphical user interface. The instructions further cause the processor to receive a second selection of a first sub-component of the one or more sub-components. The instructions also cause the processor to generate a third list of the at least one data point associated with the first sub-component, the at least one measurement associated with the at least one data point, and the at least one alarm status associated with the first sub-component, in a second portion of the graphical user interface.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 4 is a schematic view of graphics displayed on the graphical user interface for the condition monitoring system of FIG. 2 that includes a status list workspace, in accordance with an embodiment of the present disclosure;

DETAILED DESCRIPTION

Figure 1:
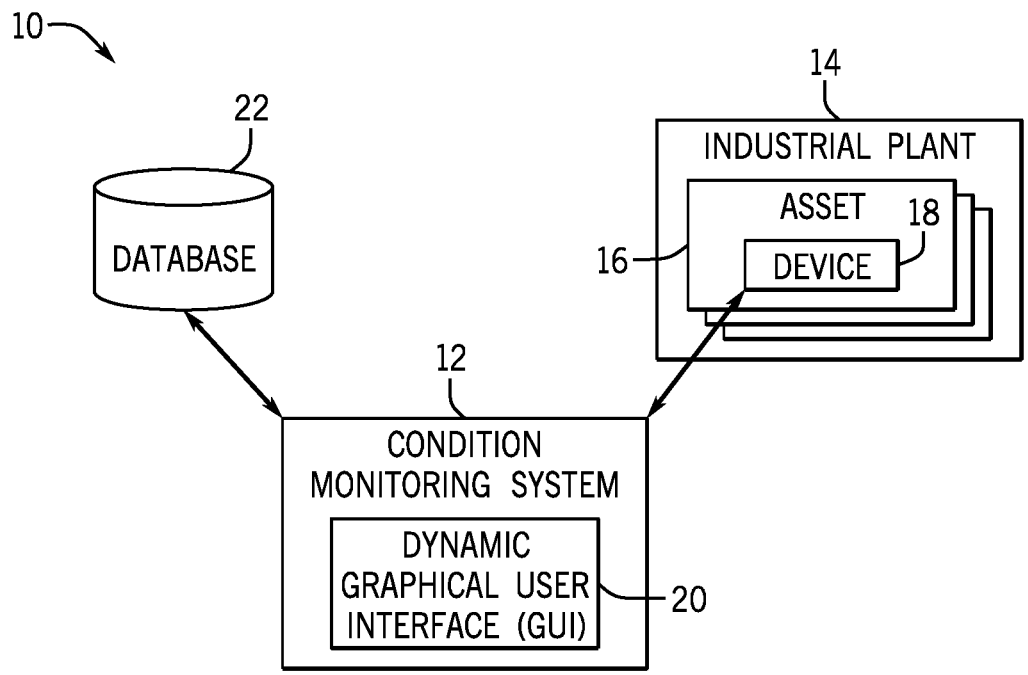
FIG. 1 is a block diagram of an industrial monitoring system, in accordance with an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

In an industrial environment, a number of machines may operate together to perform various tasks related to mass producing a product, processing certain chemicals, and the like. Generally, each of the machines in the industrial environment may include a number of sensors attached thereto to monitor various conditions within a respective machine. For example, in a motor, one sensor may measure a rotational speed of the motor's shaft, while another sensor may measure an internal temperature of the motor. The data received by these sensors may be provided as inputs into a condition monitoring system, such that the received data may be presented to users in a coherent and comprehensible manner. The received data may then be processed or analyzed by the condition monitoring system using various types of data processing or analysis tools or the like. As such, if the condition monitoring system processes the received data, the condition monitoring system may present the received data in a manner that may be interpreted or analyzed by a user. Additionally or alternatively, the received data may be processed or analyzed using a separate analysis product, which may communicate its results to the condition monitoring system.

In certain embodiments, the condition monitoring system may include a graphical user interface (GUI) that may generate lists of components and/or present visualizations that represent the machines being monitored by the condition monitoring system. The condition monitoring system may present the data received by the sensors associated with the monitored machines via the GUI. In particular, the condition monitoring system may include information for the machines being monitored, components of the machines, and devices monitoring the machines and/or components, such as alarm status, current and historical measurement values, measurement location, health information, and the like, in a sortable, selectable, list view. In this manner, the condition monitoring system may provide the user a convenient and simple way to prioritize and monitor the machines.

Moreover, the condition monitoring system may also perform certain types of data processing or analysis functions such as plotting trend graphs, plotting spectrum graphs, plotting historical charts, and the like, which may then be displayed via the GUI. In one embodiment, the lists and/or visualizations representing the monitored machines depicted on the GUI may be dynamically linked to data processing or analysis tools provided by the condition monitoring system. As such, the condition monitoring system or the separate processing or analysis product may dynamically analyze data associated with a monitored machine based on a selection of a listed component or a machine visualization from the GUI. That is, once a user has selected a listed component or a visualization of a machine via the GUI, the condition monitoring system may automatically update any processing or analysis tools currently being utilized by the GUI to analyze the data associated with the selected machine. In this manner, the GUI provides an intuitive and simple way for users to monitor machines in the industrial environment and analyze data associated with those machines using the condition monitoring system. Additional details with regard to how the GUI may dynamically control various data processing or analysis tools of the condition monitoring system will be described below with reference to FIGS. 1-13.

By way of introduction, FIG. 1 illustrates a block diagram of an industrial monitoring system 10 in which various types of machines used for industrial processes may be monitored, in accordance with an embodiment of the present disclosure. The industrial monitoring system 10 may include a condition monitoring system 12, which may receive data from various components (e.g., assets or monitoring devices) that may be part of an industrial environment. For example, the condition monitoring system may monitor components used in an industrial plant 14. The industrial plant 14 may include any type of industrial environment where different components may be used to complete one or more industrial processes. As such, the industrial plant 14 may correspond to an oil refinery, a manufacturing facility, a turbomachine system, a power generation system, a gasification system, a chemical production system, a gas turbine system, a steam turbine system, a combined cycle system, a power plant, or the like.

The components in the industrial plant 14 may include one or more machines, components, equipment, or assets 16, such as a motor, a gas turbine, a heat exchanger, centrifugal pumps, centrifugal compressors, fans, reciprocating compressors, generators, steam turbines, wind turbines, piping, axial compressors, screw compressors, gears, turbo-expanders, blowers, agitators, mixers, pulp refiners, ball mills, crushers, pulverizers, extruders, pelletizers, cooling towers, and the like. Each asset 16 may include one or more sensors or monitoring devices 18 that may monitor various aspects of a respective asset 16. The monitoring devices 18 may include temperature sensors, current sensors, voltage sensors, pressure sensors, displacement sensors, velocity sensors, acceleration sensors, flow sensors, clearance sensors, flame sensors, gas composition sensors, vibration sensors, and any other type of sensor that may provide information with respect to the operation of the respective asset 16.

Generally, the data acquired by the monitoring devices 18 may be received by the condition monitoring system 12 via a direct link (i.e., hardwired), a network link, or a portable memory device (e.g., Universal Serial Bus memory drive). In one embodiment, the condition monitoring system 12 may include a dynamic graphical user interface (GUI) 20 that may generate visualizations that represent the assets 16 and the monitoring devices 18 being monitored by the condition monitoring system 12. As such, users of the condition monitoring system 12 may monitor the health or status of assets 16 in the industrial plant 14 via the dynamic GUI 20. Further, the condition monitoring system 12 may be used to measure one or more mechanical devices of larger mechanical systems (e.g., steam turbine systems, hydraulic turbine systems, wind turbine systems, reactors, gasifiers, gas treatment systems, industrial automation systems, or other suitable mechanical systems).

The dynamic GUI 20 may enable the user to perform various types of data processing or analysis using tools provided by the condition monitoring system 12 or by separate data processing or analysis products. For instance, the user may generate a graph plotting a statistical trend of the data received from a particular monitoring device 18 over time. In one embodiment, after the trend graph has been generated, the user may dynamically control the data being analyzed by the tool by selecting a different monitoring device 18 visualization displayed in the dynamic GUI 20.

In addition to data acquired by the monitoring devices 18, the condition monitoring system 12 may receive data from a database 22 which may be stored within the condition monitoring system 12, in a server, in a cloud-computing device, or the like. The database 22 may include historical data related to the data acquired by the monitoring devices 18, calculated data associated with an asset 16 or monitoring device 18, results from previous data processing or analysis functions performed on data associated with the asset 16 or monitoring device 18, or other contextual data related to the industrial plant 14. For example, the database 22 may include data related to the historical operating conditions (e.g., when operating at full capacity) of the industrial plant 14 such as a plant historian or the like.

Although FIG. 1 has been described with respect to the industrial plant 14, it should be noted that the systems and techniques described herein may be applied to other systems outside of the industrial environment. As such, the systems and techniques described herein should not be limited to industrial environments and the like.

Figure 2:
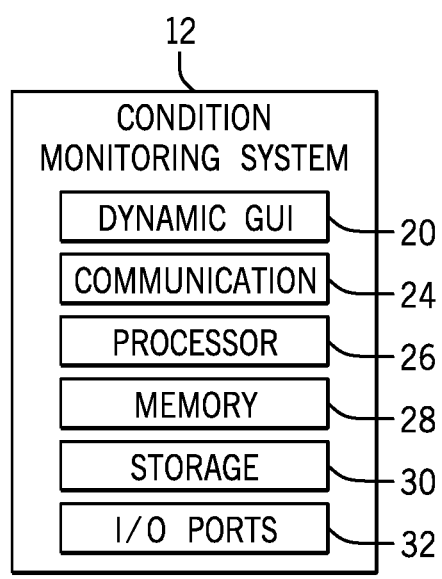
FIG. 2 is a block diagram of a condition monitoring system that may be employed in the industrial monitoring system of FIG. 1, in accordance with an embodiment of the present disclosure.

In addition to the dynamic GUI 20, the condition monitoring system 12 may include various other components to display data, processing or analysis of data, and the like, via the dynamic GUI 20. FIG. 2 illustrates a block diagram of example components that may be part of the condition monitoring system 12, in accordance with an embodiment of the present disclosure. As shown in the figure, the condition monitoring system 12 may include a dynamic GUI 20, a communication component 24, one or more processors 26, one or more memories 28, one or more storage devices 30, input/output (I/O) ports 32, and the like. The communication component 24 may be a wireless or wired communication component that may facilitate communication between the condition monitoring system 12, the assets 16, the monitoring devices 18, the database 22, other control or monitoring systems, and the like. A processor 26 may be any type of computer processor or microprocessor capable of executing computer-executable code. The memory 28 and the storage 30 may be any suitable articles of manufacture that can serve as media to store processor-executable code, data, or the like. These articles of manufacture may represent non-transitory computer-readable media (i.e., any suitable form of memory or storage) that may store the processor-executable code used by the processor 26 to, among other things, display data related to the monitored components and react to user activity (e.g., selecting a component, performing a sorting function, and the like) via the dynamic GUI 20. The non-transitory computer-readable media merely indicates that the media is tangible and not a signal.

The dynamic GUI 20 may include any type of display device including a touch screen display device that may receive user inputs via the display device itself. In certain embodiments, the dynamic GUI 20 may interact with the communication component 24, the processor 26, the memory 28, the storage 30, and the input/output (I/O) ports 32 to dynamically update or control visualizations displayed on the dynamic GUI 20. The dynamic GUI 20 may be disposed on any type of computing device including an industrial monitor, a workstation, a portable monitoring device, a smart phone device, or another suitable device.

Figure 3:
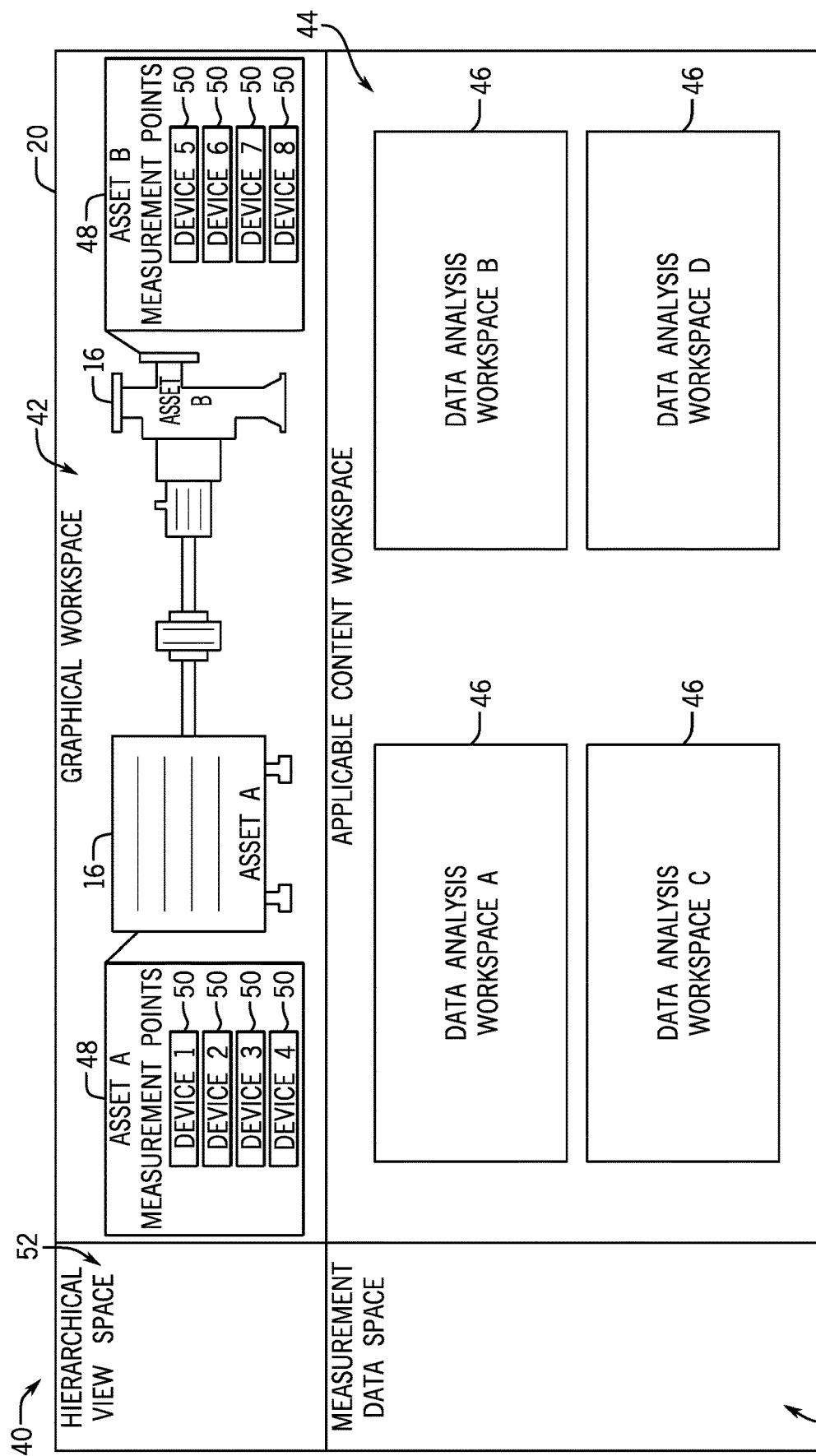
FIG. 3 is a schematic view of graphics displayed on a graphical user interface for the condition monitoring system of FIG. 2 that includes a graphical workspace, in accordance with an embodiment of the present disclosure.

Keeping the foregoing in mind, FIG. 3 illustrates an example view 40 of graphics that may be displayed by the processor 26 via the dynamic GUI 20, in accordance with an embodiment of the present disclosure. Referring to FIG. 3, the dynamic GUI 20 may include a graphical workspace 42 and an applicable content workspace 44, in accordance with an embodiment of the present disclosure. The graphical workspace 42 may include visualizations that represent the assets 16 or a subset of the assets 16 being monitored by the condition monitoring system 12. The assets 16 may be depicted in the graphical workspace 42 as an asset train diagram. The asset train diagram may illustrate how a number of assets 16 may be coupled to each other. The visualizations representing the assets 16 may be selectable components that may be interacted with by a user of the condition monitoring system 12 via the dynamic GUI 20. In one embodiment, a user of the dynamic GUI 20 may select a visualization depicted in the graphical workspace 42, and the dynamic GUI 20 may then dynamically update various processing or analysis tools currently being displayed in the applicable content workspace 44 based on data that corresponds to the asset 16 associated with the selected visualization.

The applicable content workspace 44 may include one or more data analysis workspaces 46. Each data analysis workspace 46 may include results or outputs of various data processing or analysis tools provided by the condition monitoring system 12. The data processing or analysis tools may generate plots that illustrate various trends in the acquired data, spectrum information related to the acquired data, the historical values of the acquired data, the changes in the data over time, and the like. Some additional data processing or analysis outputs may include a waveform plot, a spectrum plot, an orbit plot, a bode plot, compressor performance curves, pump performance curves, histograms, bar graphs, shaft centerline plots, circular plots, waterfall plots, and the like. As such, after selecting a visualization in the graphical workspace 42, the user of the dynamic GUI 20 may send a request to the condition monitoring system 12 to perform some type of data processing or analysis function on the data associated with the asset 16 or monitoring device 18 that corresponds to the selected visualization. The dynamic GUI 20 may then display the results or outputs of the data processing or analysis in the data analysis workspace 46.

In addition to providing results of data processing or analysis, the applicable content workspace 44 may also provide additional information related to alarm events, statuses, reference materials, and the like regarding an asset 16 or monitoring device 18 associated with a selected visualization in the graphical workspace 42. The additional information may include various reports, original equipment manufacturer datasheets, work history, and the like.

Referring back to the graphical workspace 42, the graphical workspace 42 may also include a data field 48 that may display data entries 50 associated with a respective asset 16. The data entries 50 may include real-time measurement data received from various monitoring devices 18 disposed on a respective asset 16, data calculated by the processor 26, or the like. The data entries 50 may also include an alarm status or event status indication. For example, each data entry 50 may be shaded with a particular color or associated with a particular color to indicate to the user a specific alarm status. In one embodiment, each data entry 50 may be individually selectable like the visualizations of the assets 16, such that additional information regarding the selected data entry 50 may be presented in the applicable content workspace 44 upon selection.

When a particular data entry 50 has been selected in the graphical workspace 42, the dynamic GUI 20 may dynamically update a hierarchical view space 52 to indicate that the respective data entry 50 has been selected. The hierarchical view space 52 may display a hierarchical structure of the asset train diagram depicted in the graphical workspace 42. That is, the hierarchical structure may list the components depicted in the graphical workspace 42 based on its hierarchical relationship to other components in the graphical workspace 42. For example, Asset A and Asset B may be listed underneath an enterprise that represents the entire asset train diagram depicted in the graphical workspace 42. Under each machine, the data entries 50 for each respective asset may be listed as one hierarchical step removed from the respective asset.

Keeping this in mind, when a particular data entry 50 has been selected in the graphical workspace 42, the dynamic GUI 20 may dynamically highlight the corresponding component listed in the hierarchical view space 52. In this manner, the dynamic GUI 20 may dynamically update different parts of the dynamic GUI 20 after a user makes a single selection elsewhere in the dynamic GUI 20. In the same fashion, when a particular data entry 50 has been selected in the hierarchical view space 52, the dynamic GUI 20 may dynamically highlight or select the corresponding component listed in the graphical workspace 42.

The dynamic GUI 20 may also include a measurement data space 54. The measurement data space 54 may include all measurements that may have been collected for a component selected in the hierarchical view space 52 or the graphical workspace 42. The types of collected measurements may include diagnostic waveforms/spectrums, vectors, scalar variables, and the like. Each type of collected measurement may also be a selectable component dynamically linked with a component displayed in the hierarchical view space 52, the graphical workspace 42, and the applicable content workspace 44.

In certain embodiments, the components in the graphical workspace 42, the applicable content workspace 44, the hierarchical view space 52, and the measurement data space 54 may be linked together using software pointers. That is, each selectable component may include one or more pointers that may direct the dynamic GUI 20 to data associated with the selected component, such that the graphical workspace 42, the applicable content workspace 44, the hierarchical view space 52, and the measurement data space 54 may be updated based on the data associated with the selected component. For example, when a component is selected within the graphical workspace 42, the data presented in the applicable content workspace, the hierarchical view space 52, and the measurement data space 54 may be updated to match the data associated with the selected component. In this manner, each portion of the dynamic GUI 20 may be dynamically updated based on a selection of a component via the dynamic GUI 20.

Figure 4:
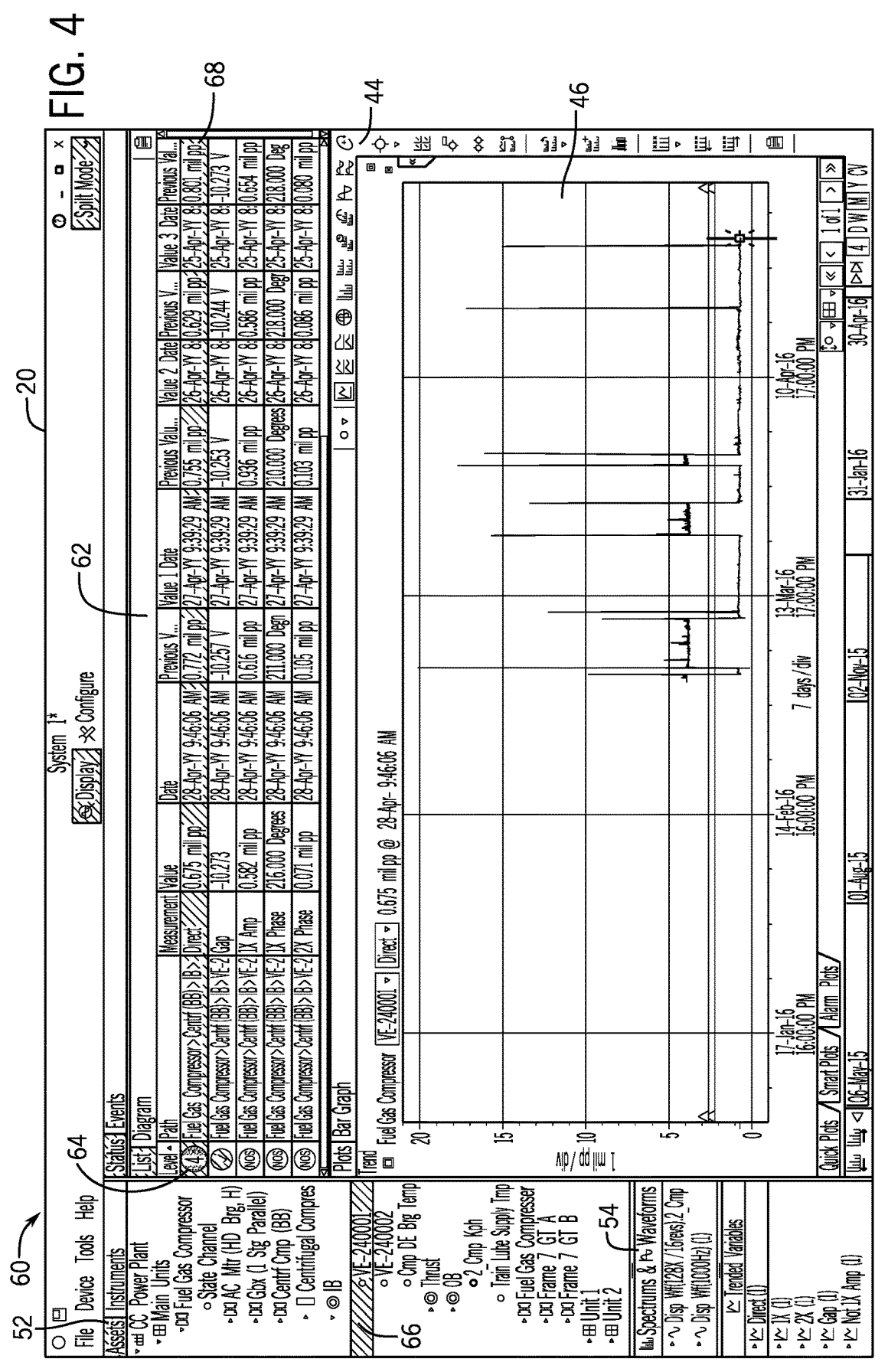

In some embodiments, the graphical workspace 42 may instead be a status list workspace. In particular, the status list workspace may include information associated with the assets and monitoring devices, such as alarm status, current and historical measurement values, measurement location, health information, and the like, in a sortable, selectable, list view. In this manner, the status list workspace may provide the user a convenient and simple way to prioritize and monitor the assets and monitoring devices. FIG. 4 illustrates an example view 60 of graphics that may be displayed by the processor 26 via the dynamic GUI 20 that includes a status list workspace 62, in accordance with an embodiment of the present disclosure. As illustrated, the status list workspace 62 includes a status indicator 64 that provides visual feedback of an alarm status for a respective asset 16 or monitoring device 18. Examples of status indicators 64 will be provided in greater detail below with reference to FIG. 5.

The hierarchical view space 52 may enable selection of the assets 16 or the monitoring devices 18 (e.g., instruments) of the industrial plant 14. After the selection is received by the processor 26, the processor 26 may identify a pointer associated with the selection and update the status list workspace 62 based on the data that corresponds to the identified pointer. Generally the status list workspace 62 may provide a list of status information, measurement values and information, and various other information related to the assets 16 and/or the monitoring devices 18 that may not be depicted in the graphical workspace 42, the hierarchical view space 52, or the measurement data space 54. In some instances, the selected asset 16 or monitoring device 18 may include sub-components. For example, a selected power plant asset may include individual power plant units as sub-component assets (or sub-assets). Similarly, a selected monitoring device that monitors an asset may include individual units as sub-component monitoring devices (or sub-monitoring devices). As such, when the processor 26 receives a selection of a power plant asset, the pointer associated with the power plant asset may provide information regarding the sub-assets. The processor 26 may then list the individual power plant units and provide additional information, such as alarm events, statuses, reference materials, and the like regarding the individual power plant units in the status list workspace 62. In some embodiments, the one or more data analysis workspaces 46 may include results or outputs of various data processing or analysis tools provided by the condition monitoring system 12 for the selected asset 16 or monitoring device 18 as described above.

In some embodiments, the additional information provided via the status list workspace 62 may include data related to the health of the selected asset 16 or monitoring device 18, such as an indication that the selected asset 16 or monitoring device 18 is running, turned off, experiencing a malfunction, and the like. Each monitoring device 18 may include a data collection status of the monitoring device 18, such as an indication that collection is enabled, disabled, and the like.

Each asset 16 or monitoring device 18 may also include one or more data points. A data point is a location of an asset where one or more measurements are acquired. The one or more measurements may be acquired by one or more monitoring devices 18 (e.g., as applicable to a selected asset 16), and may relate to temperature, pressure, speed, and the like. The one or more data points, corresponding one or more measurements, and/or one or more alarm statuses may be included in one or more datasets sent to the processor 26. As such, the status list workspace 62 may include the one or more data points and/or the one or more measurements in the status list workspace 62. The pointer associated with the selected asset 16 or monitoring device 18 may reference the one or more data points that may be associated with the selected asset 16 or monitoring device 18.

As illustrated, the processor 26 may generate a list of measurements associated with a selected data point in the status list workspace 62. For instance, the pointer associated with the selected "VE-240001" data point 66 may include various measurements (e.g., measurement 68) that may be associated with the VE-240001 data point 66. When an entry (e.g., the measurement 68) is selected in the status list workspace 62, the processor 26 may generate plots in the one or more data analysis workspaces 46 based on the selected entry. In some embodiments, the first entry displayed at the top of the status list workspace 62 (e.g., the measurement 68) may be selected by default when a selection is made in the hierarchical view space 52 (e.g., the VE-240001 data point 66). When a component is selected within the status list workspace 62, the data presented in the applicable content workspace 44, the hierarchical view space 52, and the measurement data space 54 may be updated to match the data associated with the selected component. In one embodiment, each respective data analysis workspace 46 may select relevant data points for its respective data processing or analysis functions and may disregard other data points that may not be involved for its respective data processing or analysis.

Figure 5:
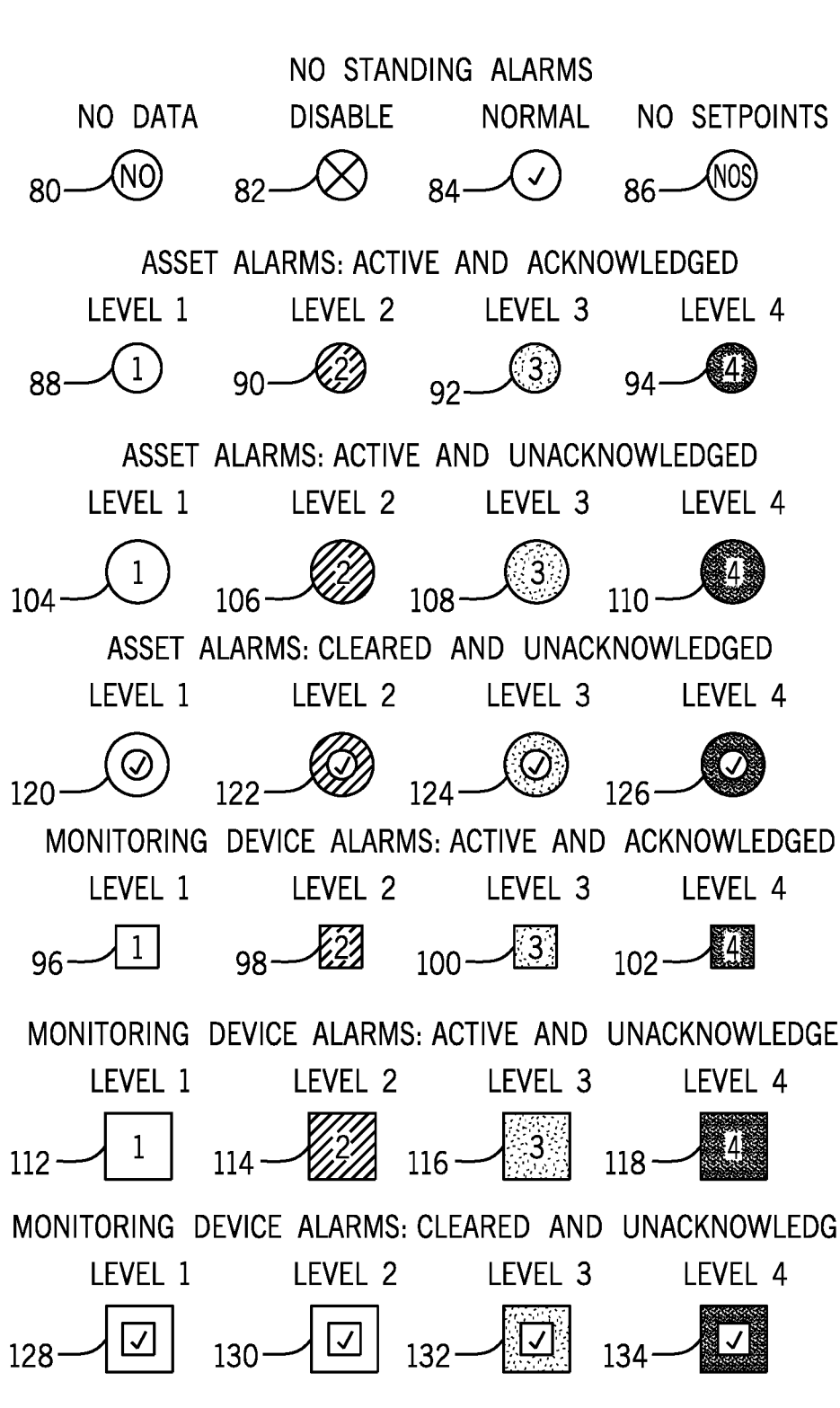
FIG. 5 is a diagram of status indicators that may be used in the status list workspace on the graphical user interface of FIG. 4, in accordance with an embodiment of the present disclosure.

FIG. 5 is a diagram of status indicators that provide visual feedback of alarm statuses for a respective asset 16 or monitoring device 18, in accordance with an embodiment of the present disclosure. The status indicator may be displayed in any portion of the dynamic GUI 20. For example, the status indicator may be displayed in any combination of the hierarchical view space 52, the status list workspace 62, or other spaces, workspaces, views, panes, and the like of the dynamic GUI 20. The status indicator may be displayed for individual measurements associated with the respective asset 16 or monitoring device 18 and may be propagated to the data points associated with the respective asset 16 or monitoring device 18 (e.g., the statuses of the individual measurements of a respective data point may be aggregated) and/or the respective asset 16 or monitoring device 18 itself (e.g., the statuses of data points of the respective asset 16 or monitoring device 18 may be aggregated).

The status indicators may indicate when there is no standing alarm for the asset or monitoring device. The status indicators may indicate information relating to the lack of standing alarm via different visualizations (e.g., text, symbols, colors, shading, and the like). For example, the status indicator 80 may indicate when no data has been collected for the asset or monitoring device. The status indicator 82 may indicate when data collection is disabled for the asset or monitoring device. The status indicator 84 may indicate when the data collection is proceeding normally and thus no alarm is activated. The status indicator 86 may indicate when no alarm setpoints (e.g., thresholds) have been configured for the asset or monitoring device. For example, the status indicator 86 may indicate when the data collection is proceeding normally but no alarm setpoints (e.g., thresholds) have been configured for the asset or monitoring device.

The status indicators may also indicate when an alarm for the asset or monitoring device is active and has been acknowledged. For example, a user may indicate that an active alarm has been noted (e.g., via a dialog box prompt or clicking the alarm on the dynamic GUI 20), thus acknowledging the alarm. The alarm may include one or more levels based on criticality or importance of the alarm. For example, a higher alarm level may indicate a more critical or important circumstance compared to a lower alarm level. The status indicators may indicate information relating to the alarm via different visualizations (e.g., text, size, colors, shading, and the like). As such, the status indicators 88, 90, 92, 94, 96, 98, 100, 102 may indicate that the alarm is active and has been acknowledged, while also indicating the level of the alarm.

The status indicators may indicate when an alarm for the asset or monitoring device is active and has not been acknowledged. The status indicators for when the alarm has not been acknowledged may be more noticeable or striking than when the alarm has been acknowledged. For example, the status indicators for when the alarm has not been acknowledged may be larger (as illustrated), brighter, include text that is underlined and/or bolded, and the like. As such, the status indicators 104, 106, 108, 110, 112, 114, 116, 118 may indicate that the alarm is active and has not been acknowledged, while also indicating the level of the alarm. In one embodiment, as time passes and the alarm is still not acknowledged, an effect of the status indicator changes (e.g., increases in size, brightness, etc.).

The status indicators may indicate when an alarm for the asset 16 or monitoring device 18 is cleared and has not been acknowledged. For example, an active alarm may clear, without being noted or acknowledged by the user (e.g., via a dialog box prompt or clicking the alarm on the dynamic GUI 20). As such, the status indicator may provide an indication that there is no standing alarm (e.g., 84) and surround the indication with an unacknowledged alarm indication (e.g., 104, 106, 108, 110, 112, 114, 116, 118). As illustrated, the status indicators 120, 122, 124, 126, 128, 130, 132, 134 may indicate that the alarm is cleared and has not been acknowledged, while also indicating the level of the alarm.

As illustrated, the status indicators (e.g., 88, 90, 92, 94) for an asset may be visually different than the status indicators (e.g., 96, 98, 100, 102) for the monitoring device 18 to enable the user to conveniently recognize the source of the alarm. It should be noted that the visualizations of the status indicators in FIG. 5 are exemplary, and other different visualizations that are suitable to distinguish statuses of the assets and the monitoring devices are contemplated. For example, the visualizations may vary in color, size, shape, intensity, text, text effect (e.g., via underline, bolding, strikethrough, double-strikethrough, font, font size), and the like, to differentiate the statuses, the sources of the alarms, and/or other characteristics of the alarms.

Figure 6:
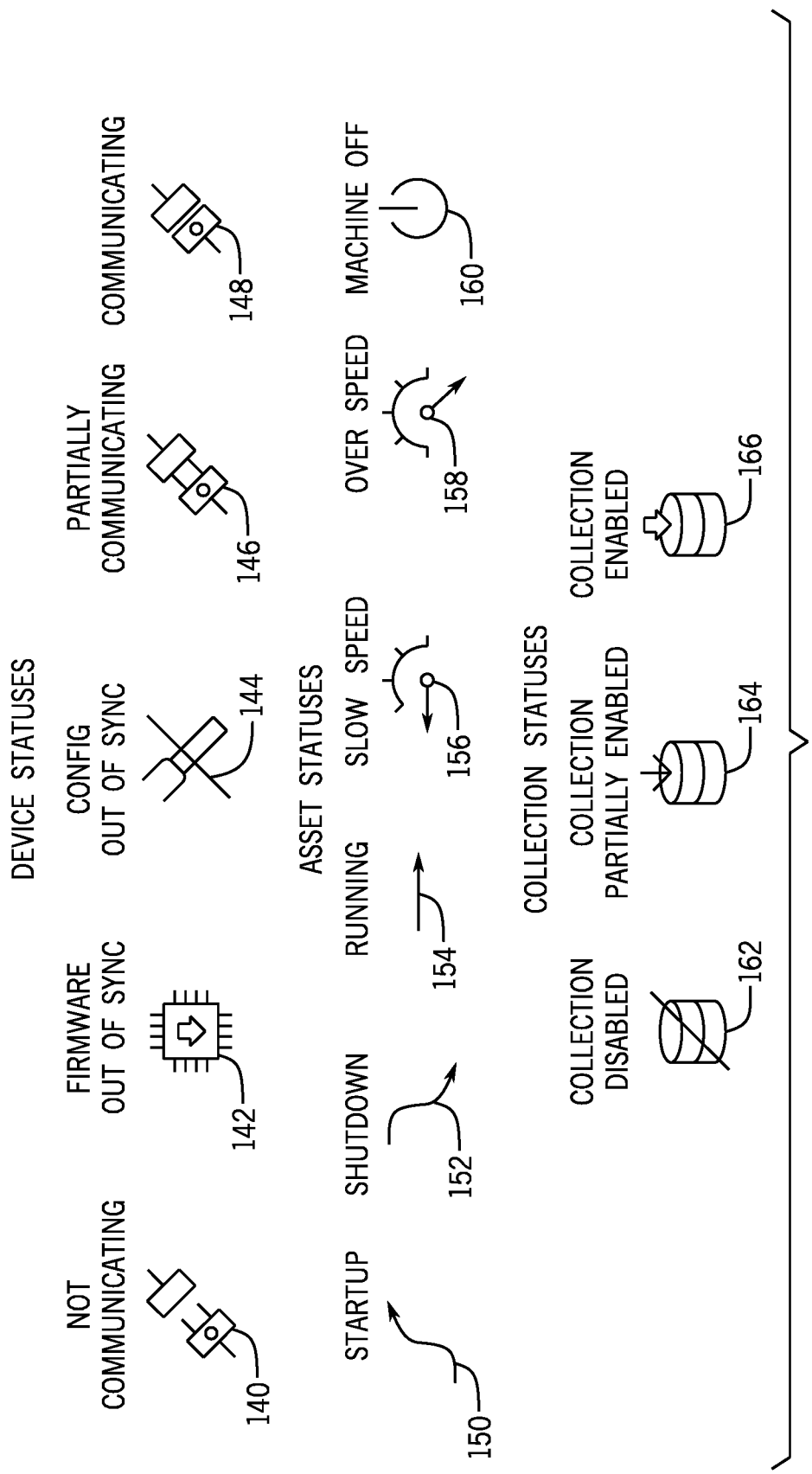
FIG. 6 is a diagram of health status indicators that may be used in the status list workspace on the graphical user interface of FIG. 4, in accordance with an embodiment of the present disclosure.

FIG. 6 is a diagram of health status indicators that provide visual feedback of health statuses for a respective asset 16 or monitoring device 18, in accordance with an embodiment of the present disclosure. The health status indicator may be displayed alongside the status indicator of FIG. 5 in any portion of the dynamic GUI 20, including the hierarchical view space 52 and the status list workspace 62. The health status indicators 140, 142, 144, 146, 148 may indicate the communication status of the monitoring device, such as "Not Communicating," "Firmware Out of Sync," "Configuration Out of Sync," "Partially Communicating," "Communicating," and the like. The health status indicators 150, 152, 154, 156, 158, 160 may indicate the operational status of the asset, such as "Startup," "Shutdown," "Running," "Slow Speed," "Over Speed," "Machine Off," and the like. The health status indicators 162, 164, 166 may indicate the data collection status of the monitoring device, such as "Collection Disabled," "Collection Partially Enabled," "Collection Enabled," and the like. As illustrated, each health status indicator is visually different to enable the user to conveniently recognize the health status of the asset and/or monitoring device. It should be noted that the visualizations of the health status indicators in FIG. 6 are exemplary, and other different visualizations that are suitable to distinguish health statuses of the assets and the monitoring devices are contemplated. For example, the visualizations may vary in iconography, color, size, shape, intensity, text, text effect (e.g., via underline, bolding, strikethrough, double-strikethrough, font, font size), and the like, to differentiate the health statuses.

Figure 7:
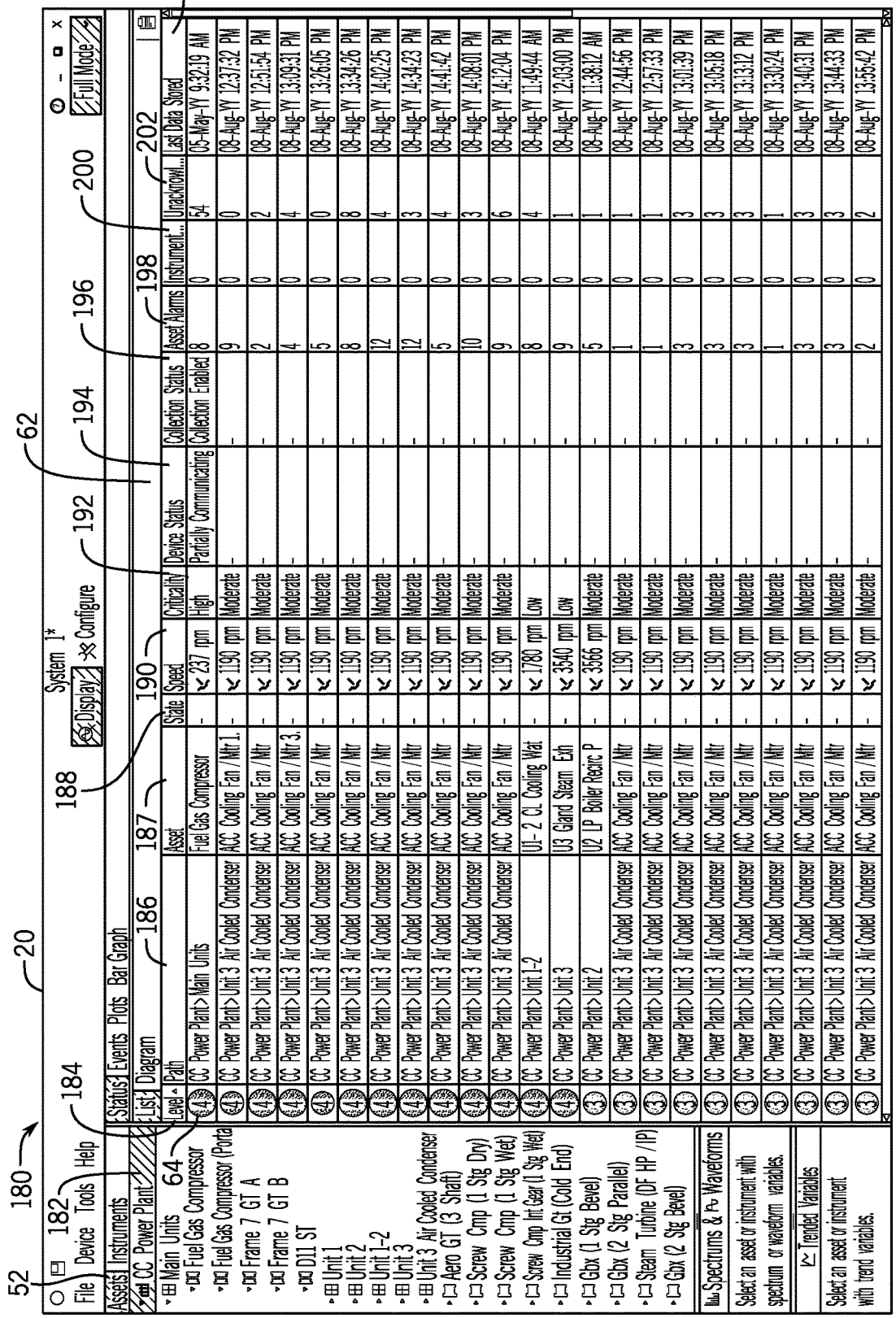
FIG. 7 is a schematic view of graphics displayed on the graphical user interface for the condition monitoring system of FIG. 2 when an asset that has sub-assets is selected, in accordance with an embodiment of the present disclosure.

The dynamic GUI 20 may provide supporting information based on the asset or monitoring device selected by the user. In some instances, an asset selected by the user may have sub-assets. As such, the dynamic GUI 20 may provide information for the sub-assets. FIG. 7 illustrates an example view 180 of graphics that may be displayed by the processor 26 via the dynamic GUI 20 when an asset that has sub-assets is selected, in accordance with an embodiment of the present disclosure. In the example view 180, the "CC Power Plant" asset 182 has been selected in the hierarchical view space 52. The CC Power Plant asset 182 may be referred to as a parent asset or an asset database because it includes sub-assets. In some embodiments, assets, monitoring devices, data points, and measurements associated with the CC Power Plant asset or database 182 and any component of the CC Power Plant asset 182 may be listed in the status list workspace 62, along with any relevant information. The information may include an alarm level 184 field of the asset (as indicated by the status indicator 64). The information may also include a path field 186 that indicates a relationship between the asset and the parent asset. The information may also include an asset field 187 that provides an identifier or name of the asset. The information may further include a state field 188 that indicates a state of the asset (e.g., the operational status of the asset of FIG. 6). The information may also include a speed field 190 that indicates a speed (e.g., in revolutions per minute) of the asset. The information may further include a criticality field 192 that indicates a criticality or importance of the asset (e.g., in relation to the parent asset or the industrial plant 14). The information may also include a device status field 194 (e.g., the communication status of the monitoring device of FIG. 6) and/or a collection status field 196 (e.g., the data collection status of the monitoring device of FIG. 6). The information may further include an asset alarms field 198 and an instrument or monitoring device alarms field 200 that indicate the number of asset alarms and monitoring device alarms that have occurred (e.g., in a desired time period). The information may also include unacknowledged alarms field 202 that indicate the number of unacknowledged alarms that are occurring or have occurred. The information may further include a last data stored field 204 that indicates the last time data was stored relating to the asset. It should be noted that the information fields are exemplary, and other different fields that are suitable to inform the user of the status of the assets and the monitoring devices are contemplated.

Figure 8:
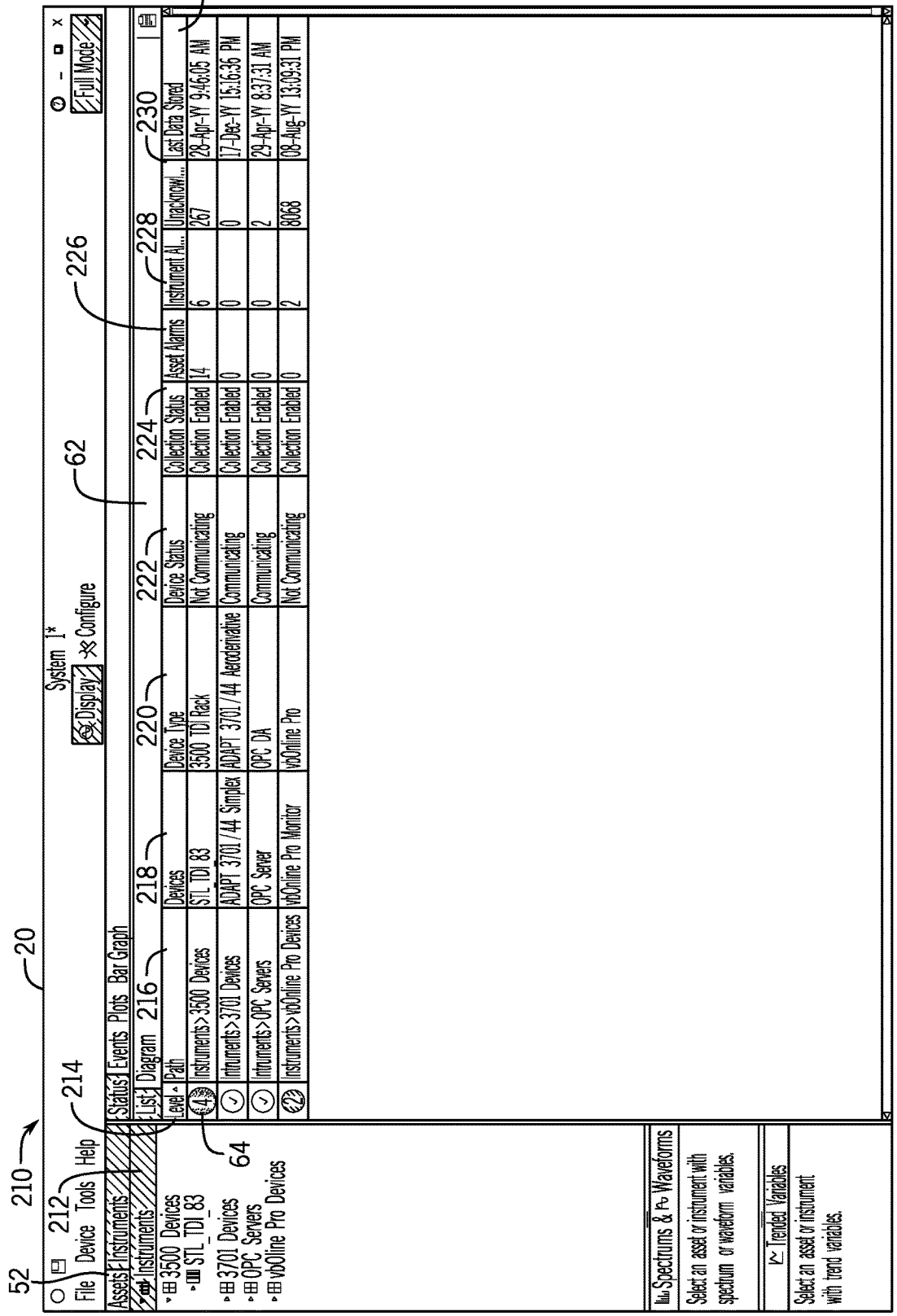
FIG. 8 is a schematic view of graphics displayed on the graphical user interface for the condition monitoring system of FIG. 2 when a monitoring device that has sub-monitoring devices is selected, in accordance with an embodiment of the present disclosure.

In some instances, a monitoring device 18 selected by the user may have sub-monitoring devices. As such, the processor 26 may provide information for the sub-monitoring devices. FIG. 8 illustrates an example view 210 of graphics that may be displayed by the processor 26 via the dynamic GUI 20 when a monitoring device that has sub-monitoring devices is selected, in accordance with an embodiment of the present disclosure. In the example view 210, the "Instruments" monitoring device 212 has been selected in the hierarchical view space 52. The Instruments monitoring device 212 may be referred to as a parent monitoring device or a monitoring device database because it includes sub-monitoring devices. In some embodiments, all monitoring devices, data points, and measurements associated with the Instruments monitoring device or database 212 and any component of the Instruments monitoring device 212 may be listed in the status list workspace 62, along with any relevant information. The information may include an alarm level 214 field of the monitoring device (as indicated by the status indicator 64). The information may also include a path field 216 that indicates a relationship between the monitoring device and the parent monitoring device. The information may further include a device field 218 that provides an identifier or name of the monitoring device. The information may also include a type field 220 that indicates a device type of the monitoring device. The information may further include a device status field 222 (e.g., the communication status of the monitoring device of FIG. 6) and/or a collection status field 224 (e.g., the data collection status of the monitoring device of FIG. 6). The information may further include an asset alarms field 226 and an instrument or monitoring device alarms field 228 that indicate the number of asset alarms and monitoring device alarms that have occurred (e.g., in a desired time period). The information may also include an unacknowledged alarms field 230 that indicate the number of unacknowledged alarms that are occurring or have occurred. The information may further include a last data stored field 232 that indicates the last time data was stored relating to the asset. It should be noted that the information fields are exemplary, and other different fields that are suitable to inform the user of the status of the assets and the monitoring devices are contemplated.

Figure 9:
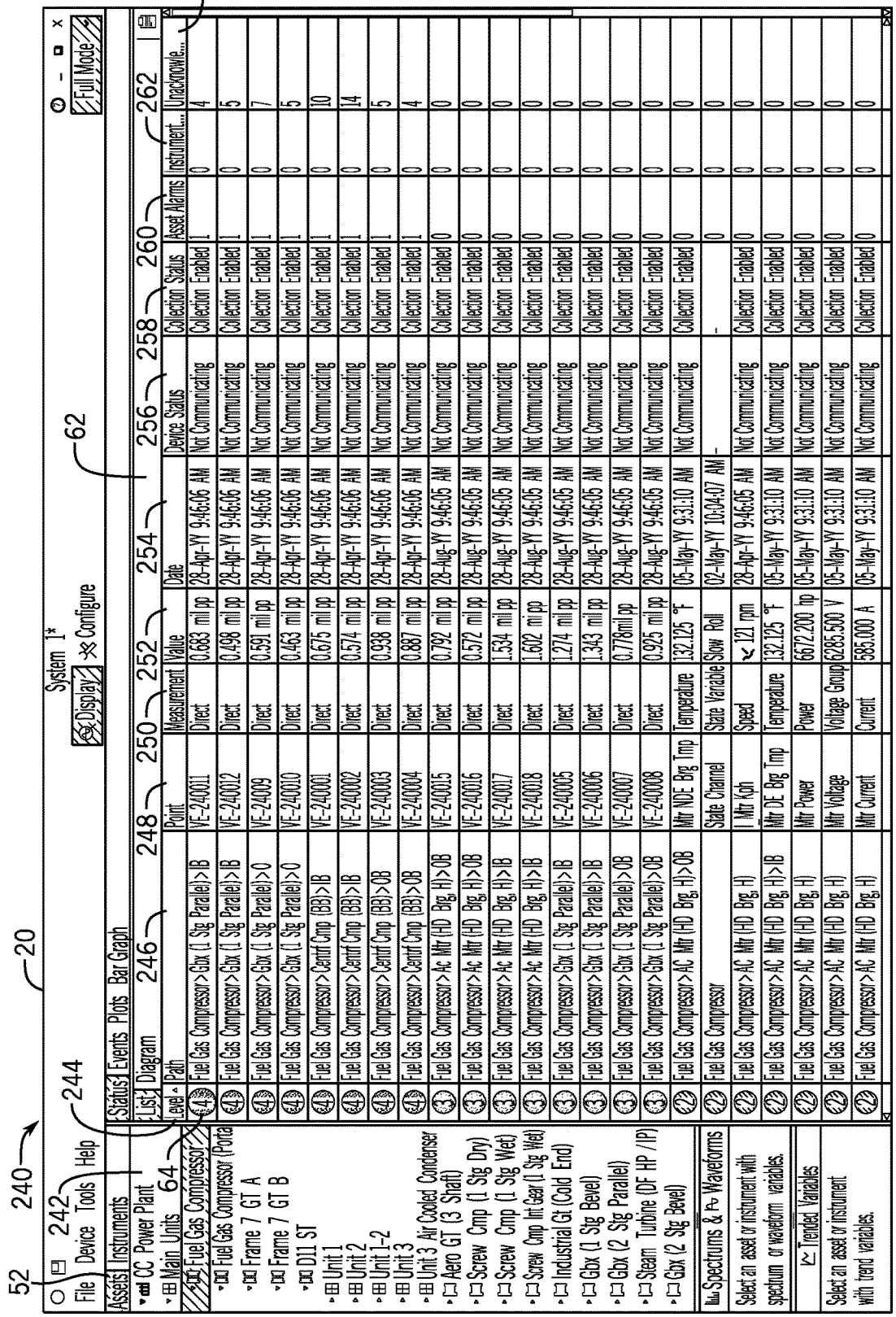
FIG. 9 is a schematic view of graphics displayed on the graphical user interface for the condition monitoring system of FIG. 2 when a sub-asset is selected, in accordance with an embodiment of the present disclosure.

In some instances, an asset selected by the user may be a sub-asset. As such, the processor 26 may provide information for at least the data points of the asset. FIG. 9 illustrates an example view 240 of graphics that may be displayed by the processor 26 via the dynamic GUI 20 when a sub-asset is selected, in accordance with an embodiment of the present disclosure. In the example view 240, the "Fuel Gas Compressor" asset 242 has been selected in the hierarchical view space 52. In some embodiments, all monitoring devices, data points, and measurements associated with the Fuel Gas Compressor asset 242 and any component of the Fuel Gas Compressor asset 242 may be listed in the status list workspace 62, along with any relevant information. The information may include an alarm level 244 field of the asset (as indicated by the status indicator 64). The information may also include a path field 246 that indicates a relationship between the data point and the asset. The information may also include a data point field 248 that provides an identifier or name of the data point. The information may further include a measurement field 250 that indicates an identifier or name of respective measurement of the data point (e.g., direct, temperature, speed, and the like). The information may also include a value field 252 that provides a value of the respective measurement. The information may further include a date and/or time field 254 that indicates a date and/or time that the respective measurement was performed. The information may also include a device status field 256 (e.g., the communication status of the monitoring device of FIG. 6) and/or a collection status field 258 (e.g., the data collection status of the monitoring device of FIG. 6). The information may further include an asset alarms field 260 and an instrument or monitoring device alarms field 262 that indicate the number of asset alarms and monitoring device alarms related to the data point that have occurred (e.g., in a desired time period). The information may also include an unacknowledged alarms field 264 that indicate the number of unacknowledged alarms related to the data point that are occurring or have occurred. It should be noted that the information fields are exemplary, and other different fields that are suitable to inform the user of the status of the assets and the monitoring devices are contemplated.

Figure 10:
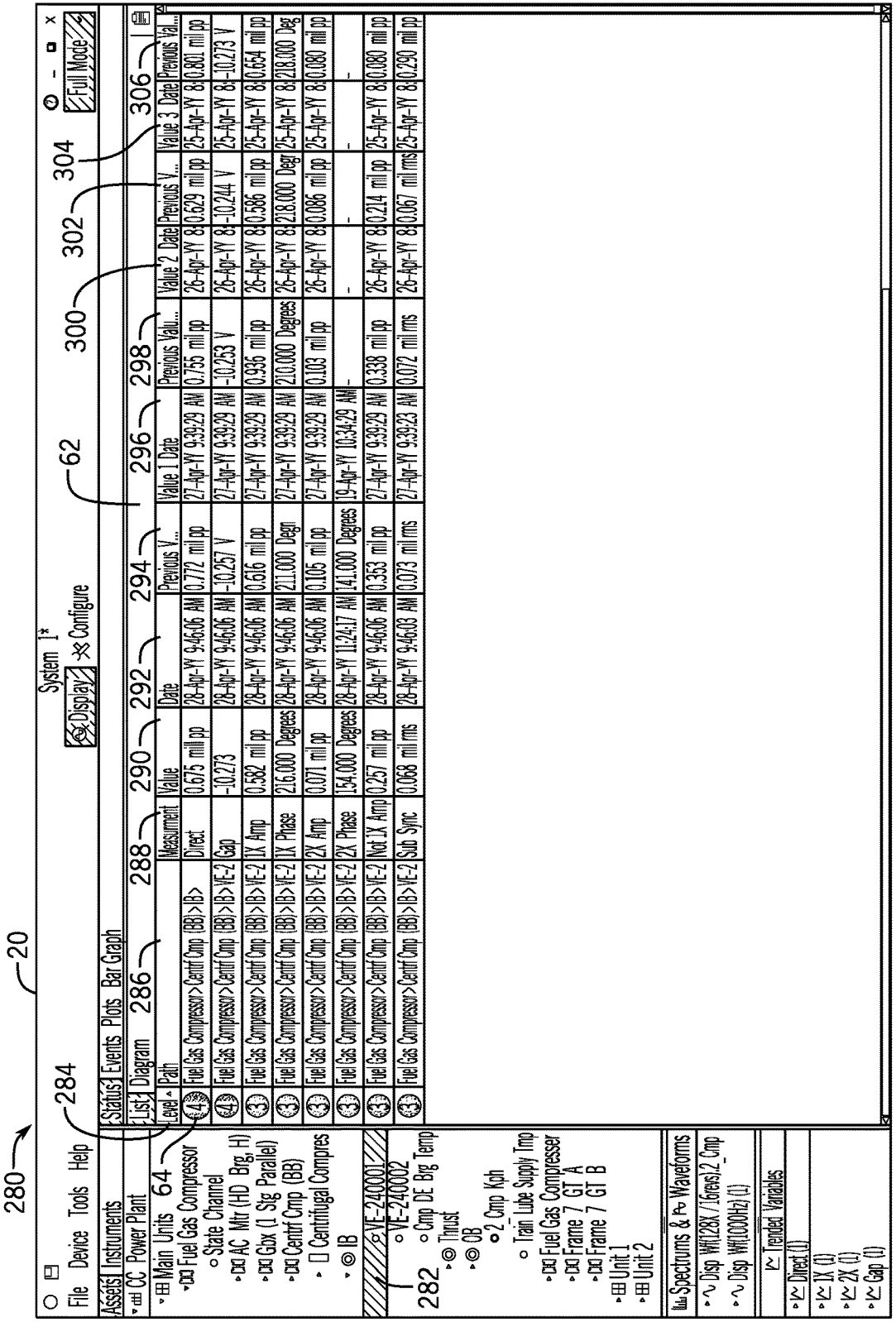
FIG. 10 is a schematic view of graphics displayed on the graphical user interface for the condition monitoring system of FIG. 2, when a data point is selected, in accordance with an embodiment of the present disclosure.

FIG. 10 illustrates an example view 280 of graphics that may be displayed by the processor 26 via the dynamic GUI 20 when a data point is selected, in accordance with an embodiment of the present disclosure. In the example view 280, the "VE-240001" data point 282 has been selected in the hierarchical view space 52. The measurements that are associated with the part of the VE-240001 data point 282 are displayed in the status list workspace 62, including information related to the measurements. The information may include an alarm level field 284 of the asset (as indicated by the status indicator 64). The information may also include a path field 286 that indicates a relationship between the measurement and a respective asset. The information may also include a measurement field 288 that provides an identifier or name of the measurement. The information may also include a value field 290 that provides a value of the measurement. The information may further include a date and/or time field 292 that indicates a date and/or time that the respective measurement was performed. The information may also include one or more previous value field 294, 298, 302, 306 that provide previous values of the measurement. The information may further include one or more previous date and/or time fields 296, 300, 304 that indicate dates and/or times that the previous measurements were performed. It should be noted that the information fields are exemplary, and other different fields that are suitable to inform the user of the status of the assets and the monitoring devices are contemplated.

Figure 11:
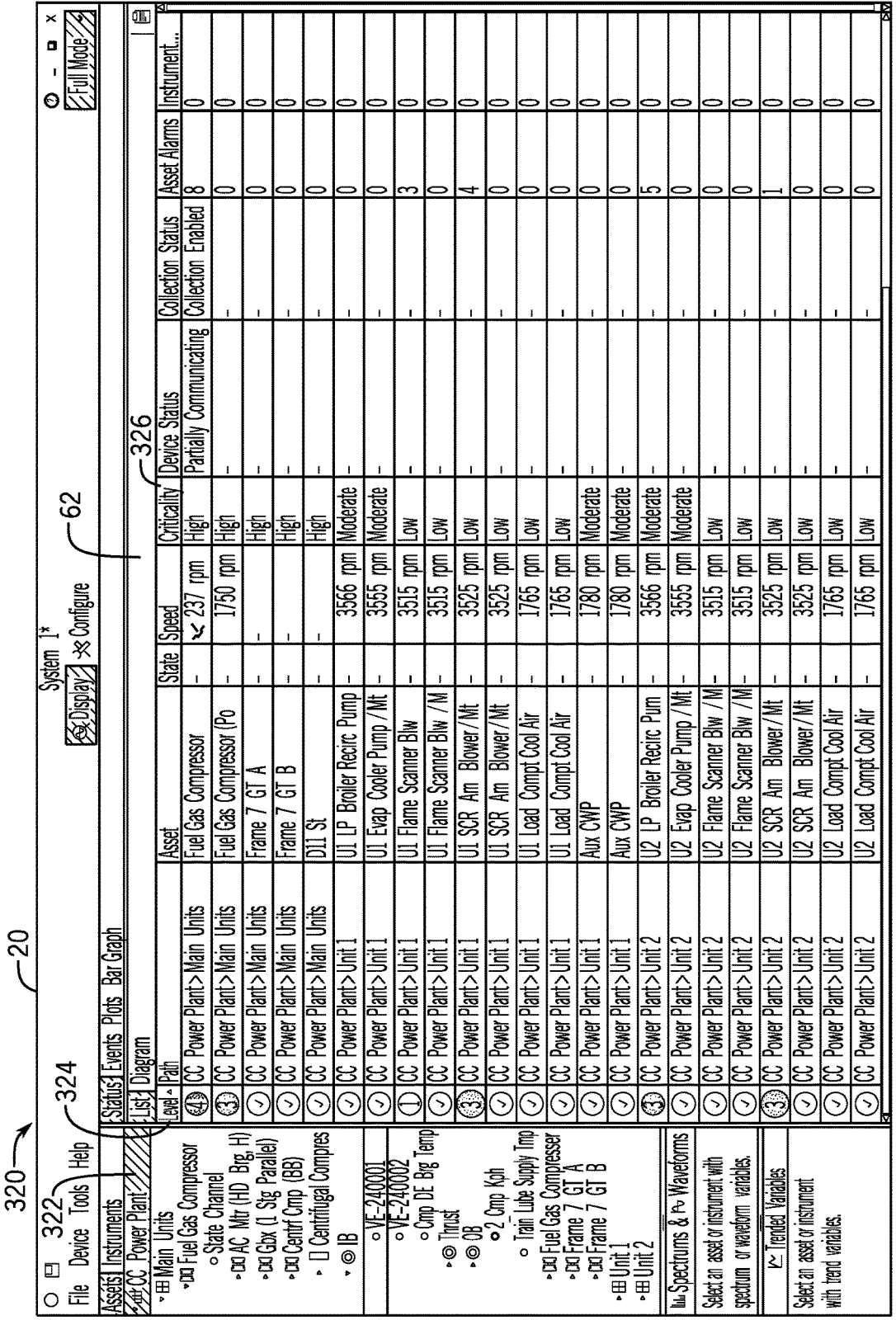
FIG. 11 is a schematic view of graphics displayed on the graphical user interface for the condition monitoring system of FIG. 2 that includes the status list workspace in hierarchical order, in accordance with an embodiment of the present disclosure.

The processor 26 enables the user to modify content within the status list workspace 62 as desired. The status list workspace 62 may be filtered, sorted, partially hidden, and the like. For example, the user may prioritize certain entries to better monitor conditions of the industrial plant 14 and components of the industrial plant 14. The user may also interact with the status list workspace 62 to expose greater detail associated with specific assets or monitoring devices. FIG. 11 illustrates an example view 320 of graphics that may be displayed by the processor 26 via the dynamic GUI 20 that includes the status list workspace 62 in hierarchical order, in accordance with an embodiment of the present disclosure. With the "CC Power Plant" asset 322 selected, all assets, monitoring devices, data points, and measurements associated with the "CC Power Plant" asset 322 and any component of the "CC Power Plant" asset 322 may be listed in the status list workspace 62. The view 320 may enable the user to view components of the selected "CC Power Plant" asset 322 in a top-down fashion.

Figure 12:
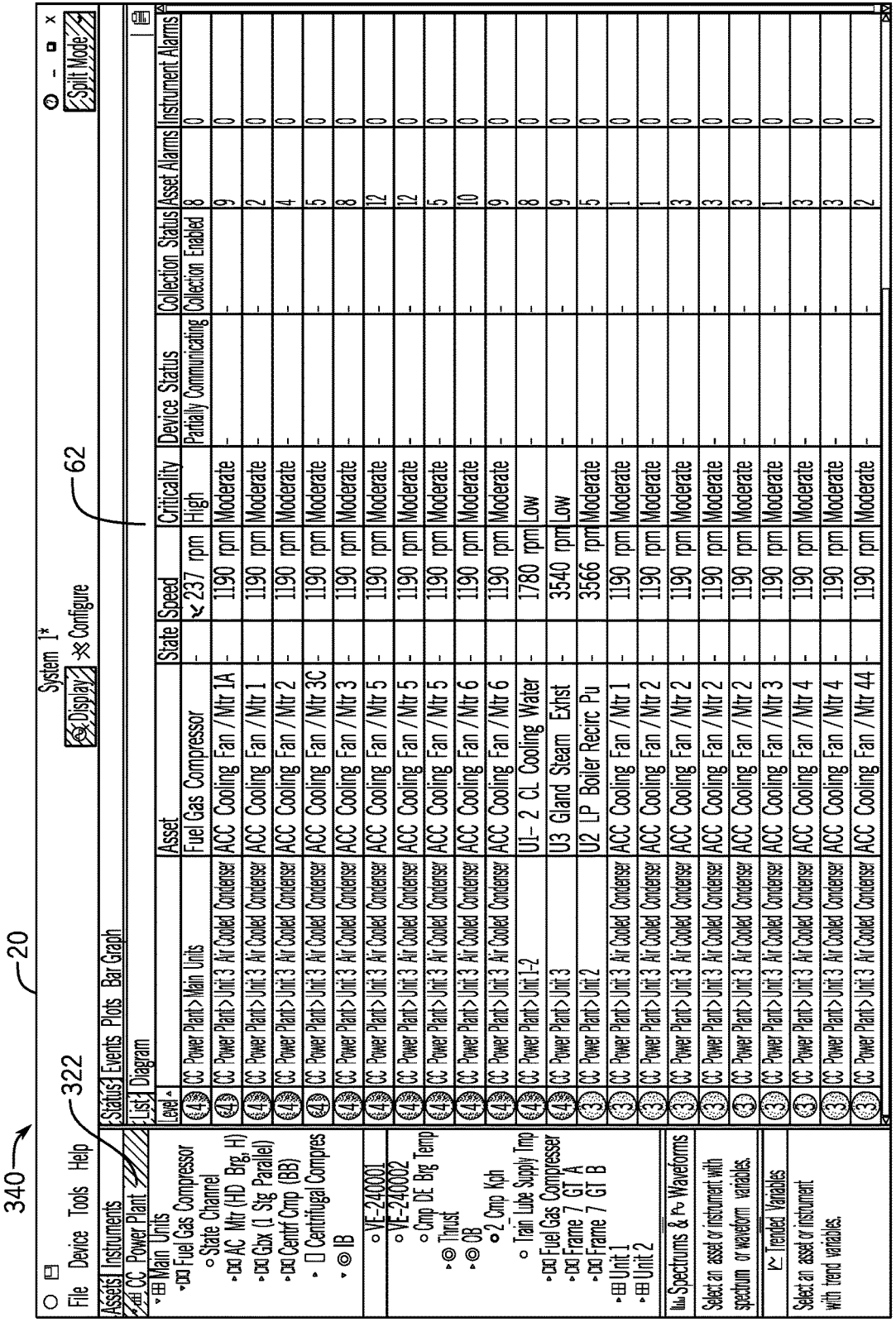
FIG. 12 is a schematic view of graphics displayed on the graphical user interface for the condition monitoring system of FIG. 2 that includes the status list workspace sorted by alarm level and criticality, in accordance with an embodiment of the present disclosure.

The user may choose to sort the components of the selected "CC Power Plant" asset 322 based on a different metric for priority. For example, the user may choose to sort selected "CC Power Plant" asset 322 based on alarm level and asset criticality. The user may sort by clicking on the corresponding column names (e.g., 324, 326). FIG. 12 illustrates an example view 340 of graphics that may be displayed by the processor 26 via the dynamic GUI 20 that includes the status list workspace 62 sorted by alarm level and criticality, in accordance with an embodiment of the present disclosure. The view 340 may enable the user to view components of the selected "CC Power Plant" asset 322 based on alarm level and asset criticality. In this manner, the user may conveniently and efficiently recognize what components of the selected "CC Power Plant" asset 322 to prioritize.

Figure 13:
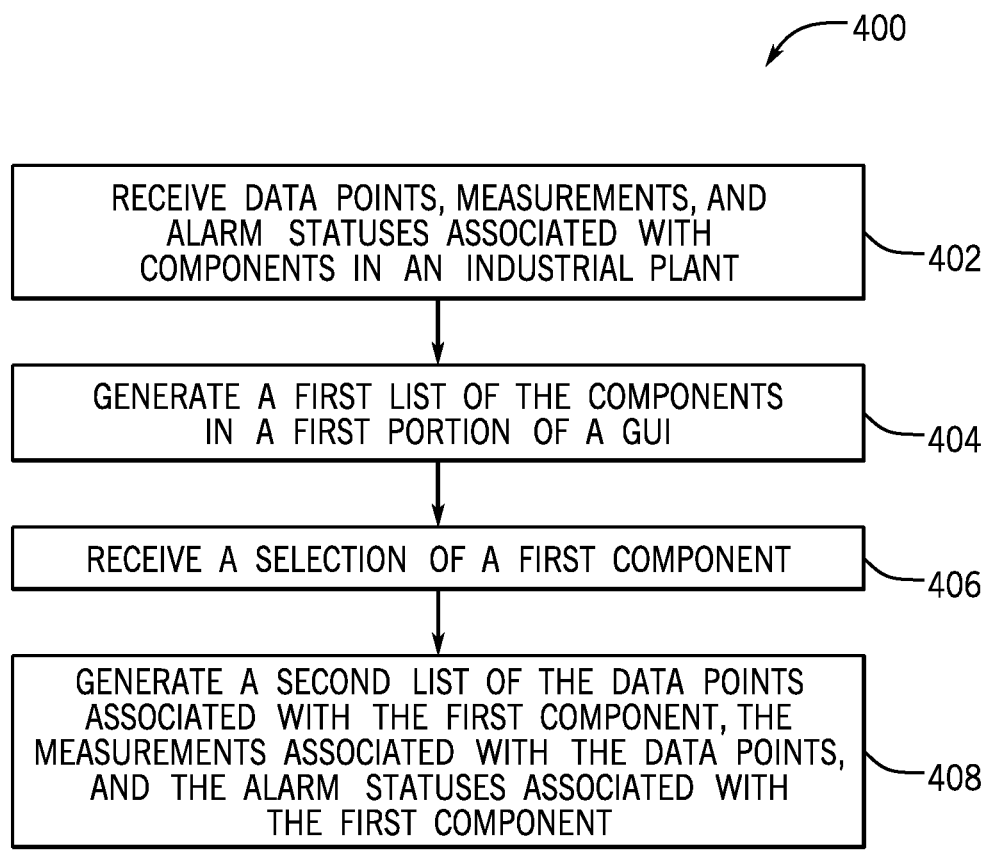
FIG. 13 is a flow diagram of method for prioritizing and monitoring assets in an industrial environment, in accordance with an embodiment of the present disclosure.

FIG. 13 is a flow diagram a method 400 for prioritizing and monitoring assets 16 in an industrial environment, in accordance with an embodiment of the present disclosure. The method 400 may enable the one or more processors 26 provide a graphical user interface with interactive components that may assist users with monitoring components in various industrial environments, thus enabling a user to intuitively and quickly realize and respond to priority situations. The method 400 may be performed by any suitable device that may prioritize and monitor the assets 16 in the industrial environment, such as the one or more processors 26. While the method 400 is described using steps in a specific sequence, it should be understood that the present disclosure contemplates that the described steps may be performed in different sequences than the sequence illustrated, and certain described steps may be skipped or not performed altogether. In some embodiments, the method 400 may be implemented by executing instructions stored in a tangible, non-transitory, computer-readable medium, such as the one or more memories 28, using a processor, such as the one or more processors 26.

Referring now to the method 400, the one or more processors 26 may receive (block 402) one or more data points 66 of a component in the industrial plant, one or more measurements 68 performed at the data points 66, or one or more alarm statuses associated with the component. The component may include an asset 16 or a monitoring device 18 of the industrial plant (e.g., that monitors the asset 16). In some embodiments, the one or more data points 66, the one or more measurements 68, and the one or more alarm statuses associated with the component may be received in the form of one or more datasets.

The one or more processors 26 may generate (block 404) a first list of the components in a first portion of a GUI. For example, as shown in FIG. 7, the one or more processors displays a hierarchical structure that lists the components of the industrial plant 14 in a hierarchical view space 52 of the dynamic GUI 20.

The one or more processors 26 may receive (block 406) a selection of a first component. The component may be an asset 16 or a monitoring device 18 that monitors the asset 16. For example, as shown in FIG. 7, the CC Power Plant asset 182 is selected.

The one or more processors 26 may then generate (block 408) a second list of data points 66 of the first component, measurements associated with the data points 66, and/or alarm statuses associated with the first component. For example, as shown in FIG. 7, the one or more processors 26 displays a list of measurements (e.g., speed measurements in the speed field 190) associated with data points of the selected CC Power Plant asset 182 and alarm statuses (e.g., via the status indicators 64) associated with the selected CC Power Plant asset 182 in a status list workspace 62 of the dynamic GUI 20. The one or more processors 26 may also generate a third list of sub-components (e.g., sub-assets or sub-monitoring devices) associated with the first component, as shown in FIGS. 7 and 8.

Technical effects of the embodiments presented in this disclosure include providing a convenient and simple graphical user interface with interactive components that may assist users with monitoring components in various industrial environments. The embodiments include listing components of machines in an industrial environment, such as assets and devices monitoring the assets, and providing and organizing information associated with the components, such as alarm status, current and historical measurement values, measurement location, health information, and the like, in a sortable, selectable, list view. In this manner, the present disclosure may enable a user to prioritize and monitor the assets and devices. For example, the present disclosure may enable the user to sort the list by alarm level and asset criticality, enabling the user to intuitively and quickly realize and respond to priority situations.

This written description uses examples to summarize the present disclosure, including the best mode, and also to enable any person skilled in the art to practice the present disclosure, including making and using any devices or systems and performing any incorporated methods. The patentable scope of the present disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising: an asset comprising a plurality of components in an industrial environment and at least one monitoring device configured to monitor at least one component of the plurality of components; one or more processors communicatively coupled to each component of the plurality of components and configured to: receive a dataset associated with each component of the plurality of components, wherein the dataset comprises at least one measurement associated with a respective component, and at least one alarm status associated with the respective component; render, in a first portion of the graphical user interface, a visual representation including a plurality of graphical objects and one or more data entries indicative of real-time measurement data associated with the at least one component, wherein a first graphical object of the plurality of graphical objects is indicative of a first component of the plurality of components; render, in a second portion of the graphical user interface, an analysis tool associated with the at least one component; render, in a third portion of the graphical user interface, a hierarchical view of one or more components of the plurality of components, wherein the third portion is configured to be updated based on selection of a data entry of the one or more data entries in the first portion of the graphical user interface; render, in a fourth portion of the graphical user interface, historical measurement data associated with one or more components of the plurality of components, wherein the fourth portion is configured to be updated based on selection of a portion of the hierarchical view in the third portion of the graphical user interface; receive a first user input indicative of a selection of the first component of the plurality of components based on an interaction of a user with the first graphical object of the plurality of graphical objects in the first portion of the graphical user interface; and update the analysis tool in the second portion of the graphical user interface based on the user input indicative of the selection of the first component.

2. The system of claim 1, wherein the industrial environment comprises an oil refinery, a manufacturing facility, a turbomachine system, a power generation system, a gasification system, a chemical production system, a gas turbine system, a steam turbine system, a combined cycle system, or a power plant.

3. The system of claim 1, where the plurality of components include a motor, a gas turbine, a heat exchanger, a centrifugal pump, a centrifugal compressor, a fan, a reciprocating compressor, a generator, a steam turbine, a wind turbine, a pipe, an axial compressor, a screw compressor, a gear, a turbo-expander, a blower, an agitator, a mixer, a pulp refiner, a ball mill, a crusher, a pulverizer, an extruder, a pelletizer, a cooling tower, or any combination thereof.

4. The system of claim 1, wherein the at least one monitoring device comprises a temperature sensor, a current sensor, a voltage sensor, a pressure sensor, a displacement sensor, a velocity sensor, an acceleration sensor, a flow sensor, a clearance sensor, a flame sensor, a gas composition sensor, a vibration sensor, or any combination thereof.

5. The system of claim 1, wherein the received dataset is indicative of a location on the respective component where the at least one measurement is acquired.

6. The system of claim 1, wherein the at least one measurement is acquired using the at least one monitoring device.

7. The system of claim 1, wherein the at least one alarm status comprises a first indication that there is no standing alarm for the respective component, a second indication that an alarm for the respective component is active and has been acknowledged, a third indication that the alarm for the respective component is active and has been acknowledged, a fourth indication that the alarm for the respective component is cleared and has not been acknowledged, or any combination thereof.

8. A method comprising: receiving, with one or more processors, a dataset associated with each component of a plurality of components in an industrial environment, wherein at least one monitoring device is configured to monitor at least one component of the plurality of components, wherein the dataset comprises at least one measurement associated with a respective component, and at least one alarm status associated with the respective component; rendering, by the one or more processors, in a first portion of the graphical user interface, a visual representation including a plurality of graphical objects and one or more data entries indicative of real-time measurement data associated with the at least one component, wherein a first graphical object of the plurality of graphical objects is indicative of a first component of the plurality of components; rendering, in a second portion of the graphical user interface, an analysis tool associated with the at least one component; rendering, in a third portion of the graphical user interface, a hierarchical view of one or more components of the plurality of components, wherein the third portion is configured to be updated based on selection of a data entry of the one or more data entries in the first portion of the graphical user interface; rendering, in a fourth portion of the graphical user interface, historical measurement data associated with one or more components of the plurality of components, wherein the fourth portion is configured to be updated based on selection of a portion of the hierarchical view in the third portion of the graphical user interface; receiving, by the one or more processors, a first user input indicative of a selection of the first component of the plurality of components based on an interaction of a user with the first graphical object of the plurality of graphical objects in the first portion of the graphical user interface; and updating the analysis tool in the second portion of the graphical user interface based on the user input indicative of the selection of the first component.

9. The method of claim 8, wherein the at least one alarm status indicates an alarm level of a plurality of alarm levels based on criticality or importance of the at least one alarm status.

10. The method of claim 8, wherein the at least one alarm status indicates when no data associated with the first component has been collected, when data collection is disabled, when the data collection is proceeding normally, when no alarm setpoints or thresholds associated with the first component have been configured, or any combination thereof.

11. The method of claim 8, wherein the dataset comprises at least one health status associated with the respective component.

12. The method of claim 11, wherein the at least one health status comprises a communication status, an operational status, a data collection status, or any combination thereof.

13. One or more tangible, non-transitory, machine-readable media comprising instructions configured to cause a processor to: receive a dataset associated with each component of a plurality of components of an asset, the dataset associated with a respective component, at least one measurement, and at least one alarm status associated with a respective component, wherein at least one monitoring device is configured to monitor at least one component of the plurality of components; render, in a first portion of the graphical user interface, a visual representation including a first plurality of graphical objects and one or more data entries indicative of real-time measurement data associated with the at least one component, wherein a first graphical object of the plurality of graphical objects is indicative of a first component of the plurality of components; render, in a second portion of the graphical user interface, an analysis tool associated with the at least one component; render, in a third portion of the graphical user interface, a hierarchical view of one or more components of the plurality of components, wherein the third portion is configured to be updated based on selection of a data entry of the one or more data entries in the first portion of the graphical user interface; render, in a fourth portion of the graphical user interface, historical measurement data associated with one or more components of the plurality of components, wherein the fourth portion is configured to be updated based on selection of a portion of the hierarchical view in the third portion of the graphical user interface; receive a first user input indicative of a selection of the first component of the plurality of components based on an interaction of a user with the first graphical object of the plurality of graphical objects in the first portion of the graphical user interface; and update the analysis tool in the second portion of the graphical user interface based on the user input indicative of the selection of the first component.

14. The one or more machine-readable media of claim 13, wherein the at least one alarm status comprises a first indication that there is no standing alarm for a respective component, a second indication that an alarm for the respective component is active and has been acknowledged, a third indication that the alarm for the respective component is active and has been acknowledged, a fourth indication that the alarm for the respective component is cleared and has not been acknowledged, or any combination thereof.

15. The one or more machine-readable media of claim 13, wherein the at least one alarm status indicates an alarm level of a plurality of alarm levels based on criticality or importance of the at least one alarm status.

* * * * *